United States Patent [19]

Makino et al.

[11] Patent Number: 4,528,004

[45] Date of Patent: Jul. 9, 1985

[54] AROMATIC POLYIMIDE COMPOSITE SEPARATING MEMBRANE

[75] Inventors: Hiroshi Makino; Yoshihiro Kusuki; Takashi Harada; Hiroshi Shimazaki; Tosio Isida, all of Ichihara, Japan

[73] Assignee: UBE Industries, Ltd., Yamaguchi, Japan

[21] Appl. No.: 574,644

[22] Filed: Jan. 30, 1984

Related U.S. Application Data

[63] Continuation of Ser. No. 393,819, Jun. 30, 1982.

[30] Foreign Application Priority Data

Jul. 8, 1981 [JP] Japan ............................. 56-105619
Jul. 10, 1981 [JP] Japan ............................. 56-107103

[51] Int. Cl.$^3$ ............................................ B01D 53/22
[52] U.S. Cl. .......................................... 55/158; 55/16; 427/385.5; 427/412.1; 428/220; 428/473.5
[58] Field of Search ................ 55/16, 158; 427/385.5, 427/412.1; 428/220, 473.5; 528/188, 220, 352, 353

[56] References Cited

U.S. PATENT DOCUMENTS

| | | | |
|---|---|---|---|
| Re. 30,351 | 7/1980 | Hoehn et al. | 55/16 |
| 3,754,375 | 8/1973 | Bouchilloux et al. | 55/16 |
| 3,822,202 | 7/1974 | Hoehn et al. | 210/500.2 X |
| 3,899,309 | 8/1975 | Hoehn et al. | 55/158 X |
| 4,113,628 | 9/1978 | Alegranti | 210/500.2 |
| 4,156,597 | 5/1979 | Browall | 55/16 |
| 4,230,463 | 10/1980 | Henis et al. | 55/16 |
| 4,378,400 | 3/1983 | Makino et al. | 55/16 X |

FOREIGN PATENT DOCUMENTS

| | | |
|---|---|---|
| 45152 | 4/1974 | Japan . |
| 99971 | 8/1975 | Japan . |
| 21602 | 2/1981 | Japan . |

*Primary Examiner*—Robert Spitzer
*Attorney, Agent, or Firm*—Burgess, Ryan & Wayne

[57] ABSTRACT

An aromatic polyimide composite membrane having a satisfactory gas-permeating property and an excellent gas-separating property comprises an aromatic polyimide porous membrane substrate and at least one coating layer which has been prepared (A) by coating at least one surface of the substrate with a dilute dope solution containing 0.01 to 5 parts by weight of a soluble aromatic polyimide and/or polyamic acid dissolved in a solvent which consists essentially of 100 parts by weight of a base component incapable of dissolving therein the substrate in an amount of 3% by weight or more and 0 to 15 parts by weight of an additional component capable of dissolving therein the 5% by weight or more of the aromatic polymeric material and compatible with the base component; and (B) by gradually evaporating the solvent from the coated dilute dope solution layer.

22 Claims, No Drawings

AROMATIC POLYIMIDE COMPOSITE SEPARATING MEMBRANE

This application is a continuation of application Ser. No. 393,819, filed June 30, 1982.

FIELD OF THE INVENTION

The present invention relates to an aromatic polyimide composite separating membrane. More particularly, the present invention relates to an aromatic polyimide composite separating membrane comprising an aromatic polyimide porous membrane substrate and at least one aromatic polyimide coating layer formed on at least one surface of the substrate and having an excellent gas-separating property in addition to a superior heat resistance and mechanical strength thereof.

BACKGROUND OF THE INVENTION

Various processes for producing an aromatic polyimide separating membrane are known. For example, Japanese patent application Laid-open No. 49-45152 discloses a process for producing an aromatic polyimide asymmetrical membrane, in which process a dope solution consisting of a homogeneous solution of an aromatic polyamic acid is spread to form a thin layer thereof and the thin dope solution layer is coagulated in a coagulating liquid containing a lower aliphatic carboxylic acid or its anhydride and a tertiary amine while imide-cyclizing the amide-acid structure in the polyamic acid into the corresponding imide structure.

In the above-mentioned known process, however, since the coagulating procedure of the dope solution layer and the imide-cyclizing procedure of the amide-acid structure are simultaneously carried out in the coagulating liquid, it is difficult to obtain an aromatic polyimide separating asymmetrical membrane having an excellent, stable gas-separating property with a satisfactory degree of reproductivity. That is, the gas-separating property of the resultant polyimide asymmetrical membrane is unstable and varies widely. In addition, the resultant polyimide asymmetrical membrane exhibits an unsatisfactory gas-permeating rate.

Japanese patent application Laid-open No. 50-99971 also discloses a process for producing an aromatic polyimide semi-permeable membrane by means of a dry membrane-forming method. Furthermore, Japanese patent application Laid-open No. 56-21602 discloses a process for producing a biphenyl tetracarboxylic acid-type aromatic polyimide semi-permeable membrane by means of a wet membrane-forming method.

The aromatic polyimide membranes produced by means of the known processes, however, exhibit an unsatisfactory gas-separating property. Also, in the case of the aromatic polyimide separating membrane produced by means of the known processes, when the membrane exhibits a satisfactory gas-separating property, usually, the gas permeability of the membrane is unsatisfactory, and when the membrane exhibits a satisfactory gas permeability, usually the gas-separating property of the membrane is unsatisfactory. That is, in the prior arts, it is difficult to obtain an aromatic polyimide membrane having both a satisfactory gas permeability and a satisfactory gas-separating property.

Usually, the intensity of the gas-separating property of the aromatic polyimide membrane is represented by the ratio ($\rho H_2/\rho CO$) of the hydrogen gas permeability ($\rho H_2$) to the carbon monoxide gas permeability ($\rho CO$) of the membrane.

SUMMARY OF THE INVENTION

An object of the present invention is to provide an aromatic polyimide composite separating membrane having both an excellent gas-separating property and a satisfactory gas permeability.

Another object of the present invention is to provide an aromatic polyimide composite separating membrane which exhibits an excellent gas-separating property and a satisfactory mechanical strength even when the membrane is used at an elevated temperature, for example, 200° C.

The above-mentioned objects can be accomplished by the aromatic polyimide composite separating membrane of the present invention which comprises:

- a substrate consisting of an aromatic polyimide porous membrane; and
- at least one coating layer formed on at least one surface of said porous membrane substrate by coating said substrate surface with a dilute dope solution containing 0.01 to 5 parts by weight of an aromatic polymeric material which consists essentially of at least one polymer selected from the group consisting of soluble aromatic polyimides and aromatic polyamic acid and which is dissolved in a solvent consisting essentially of 100 parts by weight of a base component consisting of at least one organic liquid compound incapable of dissolving therein more than 3% by weight of the aromatic polyimide in the porous membrane substrate and 0 to 15 parts by weight of an additional component consisting of at least one organic polar liquid compound capable of dissolving therein 5% by weight or more of the aromatic polymeric material and compatible with the base component; and by gradually evaporating the solvent from the coated dilute dope solution layer.

DETAILED DESCRIPTION OF THE INVENTION

The aromatic polyimide composite separating membrane of the present invention comprises a substrate consisting of an aromatic polyimide porous membrane and at least one aromatic polyimide coating layer formed on at least one surface of the porous membrane substrate.

The aromatic polyimide porous membrane substrate exhibits a large gas permeability and a poor gas-separating property. However, the gas-separating property of the porous membrane substrate can be enhanced by the aromatic polyimide coating layer while the resultant composite membrane exhibits a high gas permeability. That is, the intensity of the gas-separating property of the resultant composite membrane of the present invention is approximately 4 times or more, sometimes 5 times or more, that of the porous membrane substrate.

The aromatic polyimide porous membrane substrate usable for the present invention consists essentially of an aromatic polyimide having at least 80 molar % of at least one type of recurring unit of the formula (I):

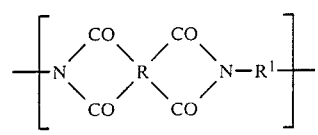
(I)

wherein R represents a tetravalent aromatic radical and R[1] represents a divalent aromatic radical.

The aromatic polyimide porous membrane substrate preferably exhibits a hydrogen gas permeability ($pH_2$) of $1 \times 10^{-7}$ cm$^3$/cm$^2$. sec.cmHg or more, more preferably $1 \times 10^{-7}$ to $1 \times 10^{-1}$ cm$^3$/cm$^2$. sec.cmHg and still more preferably $5 \times 10^{-6}$ to $5 \times 10^{-1}$ cm$^3$/cm$^2$.sec.cmHg, and a ratio ($pH_2/pCO$) of the hydrogen gas permeability ($pH_2$) to the carbon monoxide gas permeability ($pCO$) of 2 to 50, more preferably 2 to 25 and still more preferably 2.5 to 20.

The thickness of the aromatic polyimide porous membrane substrate usable for the present invention is not limited to a specific value range as long as the porous membrane substrate exhibits a satisfactory mechanical strength for actual use. However, it is preferable that the thickness of the porous membrane substrate be in the range of from 2 to 500 microns, more preferably from 5 to 300 microns.

The aromatic polyimide porous membrane substrate may be in the form of a flat film or a hollow fiber or tube.

The aromatic polyimide porous membrane substrate can be prepared in any manner, for example, in such a manner that an aromatic polymeric material consisting of at least one member selected from the group consisting of aromatic polyimides and aromatic polyamic acid is dissolved in a solvent; the resultant dope solution is shaped into a thin layer thereof; the resultant thin dope solution layer is coagulated with a coagulating liquid by means of a wet process or is dried and then heated at an elevated temperature by means of a dry process, whereby the thin dope solution is converted into a thin solid membrane; and in the case where the aromatic polymeric material in the dope solution contains the aromatic polyamic acid, the coagulating or heating procedure is carried out under conditions adequate to convert the aromatic polyamic acid into the corresponding aromatic polyimide.

The thin solid membrane is preferably prepared by means of the dry process.

The aromatic polymeric material for the porous membrane substrate may consist essentially of at least one aromatic polymer having at least 80 molar % of at least one type of recurring unit selected from those of the formulae (I) and (II):

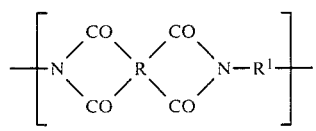
(I)

and

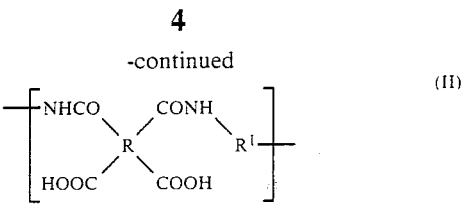
(II)

wherein R represents a tetravalent aromatic radical and R[1] represents a divalent aromatic radical.

The tetravalent aromatic radical represented by R in the formulae (I) and (II) may be selected from those of the formulae:

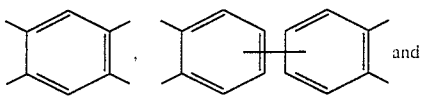

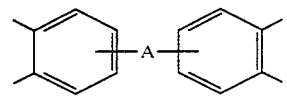

wherein A represents a divalent linking moiety selected from the group consisting of —CO—, —S—, —O—, —SO$_2$—, —SO—, —CH$_2$—, and —C(CH$_3$)$_2$—.

The divalent aromatic radical represented by R[1] in the formulae (I) and (II) is selected from those of the formulae:

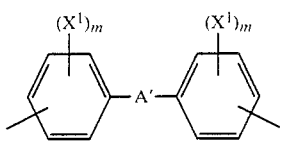

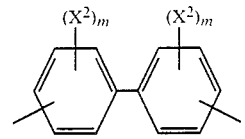

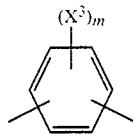

and

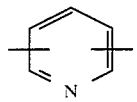

wherein X[1], X[2], and X[3] represents, independently from each other, a member selected from the group consisting of a hydrogen atom, the lower alkyl radicals having 1 to 3 carbon atoms, X[3] represents a carboxyl radical; A′ represents a divalent linking moiety selected from the group consisting of —O—, —S—, —CO—, —SO$_2$—, —SO—, —CH$_2$—, and —C(CH$_3$)$_2$—; and m represents an integer of from 1 to 4.

The carboxyl radical-containing divalent phenylene radical may be contained in an amount of 20 molar % or less, based on the entire amount of the divalent aromatic radical represented by R′.

The aromatic polymer having the recurring unit of the formula (I) or (II) can be produced by polymerizing or polymerizing and imide-cyclizing an aromatic tetracarboxylic acid component and an aromatic diamine component preferably in equimolar amounts.

The aromatic tetracarboxylic acid component preferably consists of at least one member selected from the group consisting of biphenyl tetracarboxylic acids, for example, 3,3',4,4'-biphenyl tetracarboxylic acid, 2,3,3',4'-biphenyl tetracarboxylic acid, and 2,2',3,3'-biphenyl tetracarboxylic acid; benzophenone tetracarboxylic acids, for example, 3,3',4,4'-benzophenone tetracarboxylic acid and 2,3,3',4'-benzophenone tetracarboxylic acid; 2,2-bis (3,4-dicarboxyphenyl) propane; bis (3,4-dicarboxyphenyl) methane; bis (3,4-dicarboxyphenyl) sulfone; bis (3,4-dicarboxyphenyl) ether; bis (3,4-dicarboxyphenyl) thioether; pyromellitic acid; and anhydrides, salts, and lower alcohol esters of the above-mentioned acids.

The aromatic diamine component preferably consists of at least one member selected from the group consisting of diamino-diphenyl ether compounds, for example, 4,4'-diaminodiphenyl ether, 3,3'-dimethyl-4,4'-diaminodiphenyl ether, 3,3'-dimethoxy-4,4'-diaminodiphenyl ether, 3,3'-diaminodiphenyl ether, and 3,4'-diaminodiphenyl ether; diaminodiphenyl thioether compounds, for example, 4,4'-diaminodiphenyl thioether, 3,3'-dimethyl-4,4'-diaminodiphenyl thioether, and 3,3'-diaminodiphenyl thioether; diaminodiphenyl methane compounds, for example, 4,4'-diaminodiphenyl methane, 3,3'-dimethoxy-4,4'-diaminodiphenyl methane, and 3,3'-diaminodiphenyl methane; diaminobenzophenone compounds, for example, 4,4'-diaminobenzophenone, 3,3'-diaminobenzophenone, and 3,3'-dimethyl-4,4'-diaminobenzophenone; diaminodiphenyl propane compounds, for example, 2,2-bis (4-aminophenyl) propane and 2,2-bis (3-aminophenyl) propane; diaminodiphenyl sulfoxides, for example, 4,4'-diaminodiphenyl sulfoxide; diaminodiphenyl sulfones, for example, 4,4'-diaminodiphenyl sulfone and 3,3'-diaminodiphenyl sulfone; biphenyl diamines, for example, 3,3'-dimethyl benzidine, 3,3'-dimethoxy benzidine, and 3,3'-diaminobiphenyl; phenylene diamine compounds, for example, o-, m-, and p-phenylenediamines, 3,5-diaminotoluene and 3,5-diaminobenzoic acid; and diaminopyridine compounds, for example, 2,6-diaminopyridine and 2,5-diaminopyridine.

The preferable aromatic polyimide or polyamic acid is prepared from approximately equimolar amounts of aromatic tetracarboxylic acid component consisting of at least one member selected from biphenyl tetracarboxylic acids, benzophenone tetracarboxylic acid, and anhydrides of the above-mentioned acids and an aromatic diamine component consisting of at least one member selected from diamine compounds having two benzene rings.

The aromatic polymeric material for the porous membrane substrate is dissolved in a solvent which is capable of dissolving therein at least approximately 5%, preferably approximately 7%, of the aromatic polymeric material to provide a dope solution.

In the case where the aromatic polymeric material for the porous membrane substrate consists of at least one soluble aromatic polyimide preferably having at least 70 molar %, more preferably at least 80 molar %, of the recurring unit of the formula (I), the solvent for the aromatic polymeric material may consist essentially of at least one phenolic liquid compound selected from the group consisting of monohydric phenol compounds, dihydric phenol compounds, halogenated phenols, and halogenated cresols.

The monohydric phenol compounds may be selected from phenol, o-, m-, and p-cresols, xylenols, carvacrol, and thymol. The dihyric phenol compounds may be selected from pyrocathechol, resorcinol, and hydroquinone. The halogenated phenols may be selected from 3-chlorophenol, 4-chlorophenol, 3-bromophenol, and 4-bromophenol. The halogenated cresols may be selected from 2-chloro-4-hydroxytoluene, 2-chloro-5-hydroxytoluene, 3-chloro-6-hydroxytoluene, 4-chloro-2-hydroxytoluene, 2-bromo-4-hydroxytoluene, 2-bromo-5-hydroxytoluene, 3-bromo-5-hydroxytoluene, 3-bromo-6-hydroxytoluene, and 4-bromo-2-hydroxytoluene.

In the case where the aromatic polymeric material for the porous membrane substrate consists of at least one aromatic polyamic acid having 40 molar %, preferably 50 molar %, of the recurring unit of the formula (II), the balance consisting of the recurring unit of the formula (I), the solvent for the above-mentioned type of aromatic polymeric material may consist essentially of at least one member selected from the group consisting of amide-type liquid compounds, for example, N,N-dimethylformamide, N,N-diethylformamide, N,N-dimethylacetamide, N,N-diethylacetamide, N-methyl caprolactam, and N-methyl-2-pyrrolidone; alkyl-sulfoxide-type liquid compounds, for example, dimethylsulfoxide and diethylsulfoxide; sulfone-type liquid compounds, for example, dimethyl sulfone, tetramethylenesulfone, and dimethyltetramethylene sulfone; alkyl urea-type liquid compounds, for example, tetramethyl urea and tetraethyl urea; and hexamethylphosphoramide.

In a preferable example, a dope solution for preparing the porous membrane substrate by means of a dry process is prepared in such a manner that the aromatic polymeric material is dissolved at a concentration of from 3 to 30% by weight, more preferably 5 to 25% by weight, in a solvent consisting of a mixture of 100 parts by weight of at least one polar organic liquid compound capable of homogeneously dissolving therein the aromatic polymeric material preferably in an amount of 5% by weight or more, more preferably 7% by weight or more, and 5 to 150 parts by weight, more preferably 7 to 130 parts by weight, of at least one additional aromatic compound capable of dissolving therein a limited amount of 3% by weight or less, preferably 1.5% by weight, of the aromatic polymeric material compatible with the polar organic liquid compound and having a poorer evaporating rate than that of the polar organic liquid compound.

The additional aromatic compound preferably has a boiling point of at least 5° C., more preferably 10° to 200° C., above the boiling point of the polar organic liquid compound.

The additional aromatic compound may be selected from the group consisting of phenanthrene, α-chloronaphthalene, triphenylphosphine, triphenylamine, anthracene, naphthalene, 1-methylnaphthalene, 2-methylnaphthalene, 1,2-benzanthracene, o- or p-terphenyl, aniline, and diphenyl ether.

The dope solution for the porous membrane substrate is usually filtered and degased at a temperature of 20° to 120° C., preferably 30° to 110° C., before the dope solution is subjected to the membrane-producing procedure.

In the membrane-producing procedure, the dope solution is formed into a thin layer at a temperature of from 0° to 120° C. by spreading it on a smooth surface of a membrane-forming base, for example, a glass plate, or by extruding the dope solution through a thin slit onto a smooth surface of a metallic roll or belt and by adjusting the thickness of the dope solution layer to a desired constant value.

The resultant thin dope solution layer is solidified by means of a wet method or a dry method. In the wet method, the thin dope solution layer is immersed in a coagulating liquid at a temperature of from −10° to 50° C., preferably, 5° to 30° C. The coagulating liquid consists essentially of at least one member selected from lower aliphatic alcohols and aliphatic and cycloaliphatic ketones.

In the dry method, the thin dope solution layer is dried and heated at a temperature of 20° to 400° C. so as to gradually evaporate the solvent from the dope solution layer and, if necessary so as to imide-cyclize the amide-acid structure in the polyamic acid in the dope solution into the corresponding imide structure. An aromatic polyimide porous membrane which exhibits an excellent gas-permeating property is obtained.

In the case where the dope solution contains an aromatic polyamic acid, the membrane-producing dry procedure is preferably carried out in such a manner that the filtered and degassed dope solution is coated or spread on a smooth surface of a membrane-forming base at a temperature of 0° to 120° C., more preferably 30° to 110° C., to form a thin layer thereof; and the thin dope solution layer is dried and heated at a temperature of 30° to 400° C. so as to gradually evaporate the solvent from the thin dope solution layer and to imide-cyclize the polyamic acid into the corresponding polyimide. The resultant solid membrane is separated from the membrane-forming base surface.

In the drying-heating procedure in the dry process, it is preferable that the drying operation in the initial stage of the procedure be carried out at a relatively low temperature so as to gradually evaporate the solvent from the thin dope solution layer and that the heating operation in the final stage of the procedure be carried out at a relatively high temperature so as to promote the imidization reaction of the polyamic acid and/or to enhance the mechanical strength of the membrane. For example, it is preferable that the first stage of the drying-heating operation be carried out at a temperature of 20° to 150° C. and that the final stage of the drying-heating operation be effected at a temperature of 150° to 400° C. In both stages, the temperature may be raised sharply or stepwise. For example, the final stage of the drying-heating operation at a temperature of 150° to 400° C. may be carried out by elevating the temperature stepwise, for instance, in the first step, 150° to 250° C.; in the second step, to a temperature of 30° to 100° C. above the temperature of the first step; and in the third step, to a temperature of 30° to 100° C. above the temperature of the second step.

In the drying-heating procedure, the time of each stage of the drying-heating operation is variable depending on the type and concentration of the aromatic polymeric material in the dope solution, the type of solvent, and the drying-heating temperature.

The membrane-forming base may be a smooth glass plate, a copper or steel plate having a smooth surface thereof, a surface-plated metal plate, or a heat-resistant resin plate from which the resultant membrane can be separated. The membrane-forming base also may be a rotatable metallic roll or belt having a smooth peripheral surface.

In another example of the porous membrane-producing procedure, a dope solution containing an aromatic polyamic acid and having a rotation viscosity of 500 to 100,000 centipoises at the extracting temperature is extruded through a thin extruding slit having a thickness of 0.1 to 1 mm onto a smooth peripheral surface of a rotatable metallic roll or belt at a temperature of 0° to 120° C. while adjusting the thickness of the thin layer of the dope solution to a desired constant value by using a doctor knife and by utilizing the natural spreading property of the dope solution. The thin dope solution layer is dried and heated at a temperature of from 30° to 400° C. by blowing a hot inert gas stream onto the thin dope solution layer or be applying heat generated by an electric heater to the thin dope solution layer so as to gradually evaporate the solvent and then to imidize the polyamic acid into the corresponding polyimide. The resultant solid membrane is peeled from the metallic roll or belt surface. The above-mentioned procedure is advantageous in the continuous production of the porous membrane substrate.

In the case where the dope solution contains only the aromatic polyimide, the formation of the thin dope solution layer can be carried out at a temperature ranging widely from 0° to 200° C. and no imidization operation is necessary.

The aromatic polyimide porous membrane substrate usable for the present invention preferably has such an intensity of heat resistance that even when it is heated at a temperature of up to 200° C. its gas permeability does not decrease and preferably has a pressure resistance to such an extent that even when it is exposed to a pressure of up to approximately 100 kg/cm$^2$ its gas permeability does not decrease.

As stated hereinbefore, it is preferable that the aromatic polyimide membrane substrate exhibit a hydrogen gas permeability ($\rho H_2$) of $1 \times 10^{-7}$ cm$^3$/cm$^2$·sec.cmHg or more and a ratio ($\rho H_2/\rho CO$) of 2 to 50. In the case where the aromatic polyimide membrane substrate is prepared from a dope solution containing 3 to 30% by weight of an aromatic polyimide or polyamic acid material dissolved in a solvent consisting of 100 parts by weight of a polar organic liquid compound capable of dissolving therein the aromatic polyimide or polyamic acid material and 5 to 150 parts by weight of an additional aromatic compound incapable of dissolving therein the aromatic polyimide or polyamic acid material in a concentration of 3% by weight or more, the resultant aromatic polyimide membrane substrate preferably exhibits a hydrogen gas permeability ($\rho H_2$) of $1 \times 10^{-7}$ cm$^3$/cm$^2$·sec.cmHg or more, more preferably $5 \times 10^{-7}$ cm$^3$/cm$^2$·sec.cmHg or more, and still more preferably $9.5 \times 10^{-6}$ to $1 \times 10^{-1}$ cm$^3$/cm$^2$·sec.cmHg, and a ratio $\rho H_2/\rho CO$ of 50 or less, more preferably 40 or less, and still more preferably 2.5 to 30.

The aromatic polyimide membrane substrate may be completely free from the solvent or may contain a slight amount of a portion of the solvent, that is, the polar organic liquid compound and/or the additional aromatic compound.

The aromatic polyimide porous membrane substrate is coated with at least one coating layer.

The coating layer is formed by coating at least one surface of the porous membrane substrate with a diluted dope solution containing 0.01 to 5 parts by weight, preferably 0.01 to 3 parts by weight and more preferably 0.05 to 2 parts by weight, of an aromatic polymeric material which consists essentially of at least one polymer selected from the group consisting of aromatic polyimides and aromatic polyamic acids and which is dissolved in a solvent consisting of 100 parts by weight of a base component consisting of at least one organic liquid compound incapable of dissolving therein the aromatic polyimide in the porous membrane substrate in an amount of 3% by weight or more, preferably 2% by weight or more, and 0 to 15 parts by weight, preferably 0 to 12 parts by weight, of an additional component consisting of at least one organic polar liquid compound capable of dissolving therein the aromatic polyimide in the porous membrane substrate preferably in an amount of 5% by weight or more, more preferably 7% by weight or more, and compatible with the base component; and by gradually evaporating the solvent from the coated dilute dope solution layer.

The aromatic polyimide may be selected from those having at least 70 molar %, preferably 80 molar % or more, and still more preferably 90 molar % or more, of at least one type of recurring unit of the formula (I).

Also, the aromatic polyamic acid may be selected from those having at least 40 molar %, preferably 50 molar % or more and still more preferably 60 molar % or more, of at least one type of recurring unit of the formula (II).

The solvent may consist of the base component alone as long as the base component is capable of homogeneously dissolving therein a desired amount of the aromatic polymeric material for the coating layer.

Also, in the case where the base component exhibits a very poor dissolving property or non-dissolving property for the aromatic polymeric material for the coating layer, the solvent may consist of a mixture of the base component and the additional component.

The base component in the solvent may consist of at least one member selected from amide-type liquid compounds, for example, acetamide, formamide, N-methyl-2-pyrrolidone, N,N-dimethylacetamide, N,N-diethylacetamide, N,N-dimethylformamide, N,N-diethylformamide, and N-methylcaprolactam; alkylsulfoxide-type liquid compounds, for example, dimethylsulfoxide and diethylsulfoxide; alkyl urea-type liquid compounds, for example, tetramethyl urea and tetraethyl urea; cyclic ether-type liquid compounds, for example, dioxane and trioxane; glycol-type liquid compounds, for example, ethylene glycol, ethylene glycol monomethylether, and ethylene glycol dimethylether; and halogenated hydrocarbon-type liquid compounds, for example, chlorobenzene, o-dichlorobenzene, 1,2,4-trichlorobenzene, bromobenzene, o-dibromobenzene, p-chlorotoluene, α-chloronaphthalene, α-bromonaphthalene, 1,1,2,2-tetrachloroethane, 1,1,2,2-tetrabromoethane, 1,2-dichloropropane, 1,2-dichloroethane, dichloromethane, chloroform, and tetrachloromethane.

The additional component in the solvent for the soluble aromatic polyimide may consist of at least one member selected from phenol-type liquid compounds, for example, phenol, cresols, xylenols, halogenated phenol compounds, halogenated cresol compounds, and procathechol.

For example, in the case where the aromatic polymeric material for the coating layer consists of an aromatic polyamic acid having 40 molar % or more, preferably 50 molar % or more, and still preferably 60 molar % or more, of the recurring unit of the formula (II), the balance consisting of the recurring unit of the formula (I), the solvent may be the base component alone consisting of at least one member selected from the amide-type liquid compounds, alkylsulfoxide-type liquid compounds, alkylurea-type liquid compounds, cyclic ether-type liquid compounds, and glycol-type liquid compounds. The above-mentioned liquid compounds can dissolve therein 0.01 to 5 parts by weight of the aromatic polyamic acid per 100 parts by weight of base component but cannot dissolve therein 2% by weight or more of the aromatic imide in the porous membrane substrate. Therefore, the solvent may contain no additional component.

In another example, in the case where the aromatic polymeric material for the coating layer is an aromatic polyimide material consisting essentially of at least one aromatic polyimide having at least 70 molar %, preferably 80 molar % or more, and still more preferably 90 molar % or more, of at least one type of recurring unit selected from those of the formulae (III) and (IV):

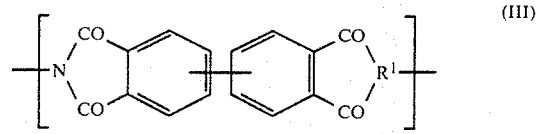

and

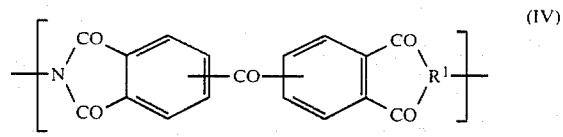

wherein R¹ represents a divalent aromatic radical, the solvent for the aromatic polyimide material consists of 85 to 95% by weight of the base component consisting of at least one member selected from the halogenated hydrocarbon-type liquid compounds, amide-type liquid compounds, alkylsulfoxide-type liquid compounds, alkyl urea-type liquid compounds, cyclic ether-type liquid compounds, and glycol-type liquid compounds and 5 to 15% by weight of the additional component consisting of one or more phenolic-type liquid compounds. This type of solvent can dissolve therein 0.01 to 5 parts by weight of the aromatic polyimide material for the coating layer but per 100 parts by weight of the base component, cannot dissolve therein 3% by weight or more of the porous membrane substrate.

In still another example, in the case where the aromatic polymeric material for the coating layer is an aromatic polyimide material consisting essentially of at least one aromatic polyimide having at least 70 molar % of at least one type of recurring unit of the formula (I), preferably of the formulae (III) and/or (IV), the solvent may consist of 100 parts by weight of a base component consisting of at least one halogenated hydrocarbon-type liquid compound and 0.5 to 15 parts by weight of an additional component consisting of at least one phenolic-type liquid compound.

When the aromatic polyimide contains one type of recurring unit other than that of the formulae (III) and (IV), no solvent capable of dissolving the aromatic polyimide has been found. Accordingly, it is preferable to use the corresponding polyamic acid as a precursor compound of the aromatic polyimide.

The aromatic polymeric material for the coating layer may be the same as or different from the aromatic polymeric material in the porous membrane substrate. These aromatic polymeric materials can be produced in accordance with any methods, for example, those disclosed in Japanese patent application Publication Nos. 37-97 (1962) and 37-10945 (1962) and Japanese patent application Laid-open Nos. 50-113597 (1975) and 55-65227 (1980).

The aromatic polymeric material for the coating layer preferably exhibits a logarithmic viscosity of from 0.1 to 7.0, more preferably from 0.2 to 5.0, determined in a concentration of 0.5 g per 100 ml of a solvent at a temperature of 30° C. or 50° C.

In a case where the aromatic polymeric material for the coating layer consists of the aromatic polyimide alone, it is preferable that the degree of imidization of the polyimide be 90% or more, more preferably 95% or more.

The dilute dope solution for the coating layer preferably has a rotation viscosity of 1 to 500,000 centipoises, more preferably 5 to 10,000 centipoises and still more preferably 10 to 10,000 centipoises, at a temperature of 30° C.

The base component of the dilute dope solution may comprise at least one member selected from benzene, toluene, xylene, cyclohexane, tetrahydrofuran, methylethyl ketone, and carbon disulfide, which are effective for controlling the dissolving property of the solvent for the aromatic polymeric material.

The dilute dope solution for the coating layer contains 0.01 to 5 parts by weight of the aromatic polymeric material per 100 parts by weight of the base component. If the aromatic polymeric material is contained in an excessively small amount, the resultant dilute dope solution cannot form a stable, dense coating layer on the entire surface of the porous membrane substrate. Therefore, the resultant composite membrane exhibits an unsatisfactory gas-separating property. Also, if the concentration of the aromatic polymeric material is excessively large, a portion of the aromatic polymeric material deposits from the resultant dilute dope solution or the resultant dense coating layer has an excessively large thickness. Therefore, the finally obtained composite membrane exhibits an unsatisfactory gas-permeating property.

In the dilute dope solution for the coating layer, the amount of the additional component of the solvent is limited to 0 to 15 parts by weight per 100 parts by weight of the base component of the solvent. If the amount of the additional component in the solvent is excessively large, sometimes, the porous structure in the porous membrane substrate is modified by the solvent so that the gas-permeating rate of the resultant composite membrane is remarkably decreased. If the solvent exhibits an unsatisfactory dissolving property for the aromatic polymeric material, sometimes a portion of the aromatic polymeric material is precipitated from the dilute dope solution and the resultant composite membrane exhibits an unsatisfactory gas-separating property.

The coating procedure of the dilute dope solution can be carried out in any manner. However, it is necessary that the coating procedure be carried out at a temperature at which the solvent in the dilute dope solution does not rapidly evaporate or boil, the dilute dope solution does not unevenly solidify or gelatinate, and no component deposits from the dilute dope solution. Therefore, the coating procedure is usually carried out at a temperature of 0° to 80° C., preferably 0° to 50° C.

The coating procedure may be carried out by spreading, spraying, or brushing the dilute dope solution onto a surface of the porous membrane substrate, by coating the surface of the porous membrane substrate with the dilute dope solution by using a coating roll or a doctor knife, or by immersing the porous membrane substrate in the dilute dope solution so as to form a thin coating layer of the dilute dope solution on the surface of the porous membrane substrate.

The thin coating layer of the dilute dope solution preferably has a uniform thickness of from 0.1 to 200 microns, more preferably 1 to 100 microns and still more preferably 2 to 80 microns.

Before the dilute dope solution is applied, the porous membrane substrate may be immersed in a treating liquid having a boiling point of approximately 300° C. or less and a low viscosity and consisting of at least one member selected from lower aliphatic alcohols, lower aliphatic ketones, benzene-type liquid compounds, lower aliphatic esters, lower aliphatic hydrocarbons, and cycloaliphatic hydrocarbons and then dried to the extent that a portion of the treating liquid located on the outer surface of the porous membrane substrate is removed but the remaining portion of the treating liquid is maintained inside the porous membrane substrate. This treatment is effective for preventing the dilute dope solution from penetrating into the inside of the porous membrane substrate and for forming a thin coating layer of the dilute dope solution located only on the outer surface of the porous membrane substrate.

The coating layer of the dilute dope solution is dried and heated preferably at a temperature of 20° to 300° C., more preferably 25° to 250° C. The drying-heating procedure may be carried out while blowing an inert gas into the drying-heating apparatus and/or under a reduced pressure. The drying-heating procedure may be carried out so that the solvent is completely evaporated from the coating layer or so that a small portion of the solvent remains in the coating layer, as long as the resultant composite membrane is usable as a gas-separating membrane.

In the drying-heating procedure, it is preferable that the heating temperature be elevated stepwisely. For example, the drying-heating procedure is carried out first at a low temperature of 20° to 80° C., preferably 25° to 60° C., while blowing an inert gas, for example, dry air or dry nitrogen gas, for 0.1 to 50 hours, preferably 0.5 to 30 hours, second at an elevated temperature of 80° to 150° C., preferably 85° to 140° C., for 0.1 to 10 hours, preferably 0.2 to 5 hours, and, if necessary, third at a further elevated temperature of 150° to 300° C., preferably 160° to 250° C., for 0.1 to 20 hours, preferably 0.2 to 10 hours. The drying-heating procedure may be carried out in four steps or more, each step being carried out at a desired temperature.

In the case where the dilute dope solution contains an aromatic polyamic acid, it is preferable that the heating procedure be carried out in such a manner that the final heating temperature becomes 150° C. or more and the polyamic acid is imidized into the corresponding polyimide.

The composite separating membrane of the present invention is composed of an aromatic polyimide porous membrane substrate preferably having a thickness of 2 to 500 microns, more preferably 5 to 300 microns, and at least one aromatic polyimide dense coating layer preferably having a thickness of 5 microns or less, more preferably 1 micron or less. Since the composite membrane entirely consists of the aromatic polyimide material having an excellent heat resistance, the composite membrane can be used in the gas-separating process at a wide range or temperature of from room temperature to approximately 200° C. or more.

Also, the composite separating membrane of the present invention exhibits a hydrogen gas permeability ($pH_2$) of $1 \times 10^{-7}$ cm$^3$/cm$^2$.sec.cmHg or more, preferably $5 \times 10^{-6}$ cm$^3$/cm$^2$.sec.cmHg, and a $pH_2/pCO$ ratio of 25 or more, preferably 95 or more, and sometimes 100 to 350 under specific conditions.

Accordingly, the composite membrane of the present invention is useful as a gas separation or a gas concentrator.

SPECIFIC EXAMPLES

Examples of the present invention and comparative examples are illustrated below.

In the examples and comparative examples, the gas permeability of the polyimide membrane was determined by the following gas-transmission test. In the test, the membrane to be tested was placed in a stainless steel cell having a permeating area of 14.65 cm$^2$ and a hydrogen gas and a carbon monoxide gas were supplied to the cell at a temperature of 30° C. under a pressure of 3.0 kg/cm$^2$G. The amount (volume) of gas passed through the membrane was measured by using a flow meter.

The gas permeability ($p$) of both gases was calculated from the following equation:

$$\text{Gas permeability } (p) \text{ (cm}^3\text{/cm}^2 \cdot \text{sec} \cdot \text{cmHg)} = \frac{X}{A \times T \times D}$$

wherein X represents the amount (volume) in cm$^3$ (STP) of gas passed through the membrane, A represents the permeating surface area in cm$^2$ of the membrane through which the gas passed, T represents the transmission time in seconds of the gas passed through the membrane, and D represents the difference in pressure in cmHg between the gas-supply side and the opposite side of the membrane.

EXAMPLE 1 (Preparation of a porous membrane substrate A)

A separable flask with a stirrer and a conduit for introducing thereinto nitrogen gas was charged with a mixture of 40 millimoles of 3,3',4,4'-biphenyl tetracarboxylic dianhydride, 40 millimoles of 4,4'-diaminodiphenyl ether, and 165 ml of para-chlorophenol. The mixture was subjected to a single step polymerization-imidization procedure while elevating the temperature of the mixture from room temperature to 180° C. over approximately 50 minutes and maintaining the temperature of the mixture at 180° C. for 8 hours and while flowing nitrogen gas through the flask. A viscous aromatic polyimide solution was obtained.

The resultant dope solution contained 10% by weight of the polyimide having a degree of imidization of 95% or more and a logarithmic viscosity of 2.2 determined in a concentration of 0.5 g per 100 ml of para-chlorophenol at a temperature of 50° C.

The logarithmic viscosity of the polymer was calculated in accordance with the following equation:

$$\text{Logarithmic viscosity} = \frac{\text{natural logarithm}\left(\frac{\text{viscosity of solution}}{\text{viscosity of solvent}}\right)}{\text{concentration of polymer in solution}}$$

The degree of imidization of the polymer was determined by measuring the height of infrared absorption peaks at 1780 cm$^{-1}$ and 720 cm$^{-1}$.

The dope solution was spread on a smooth surface of a horizontal glass plate at a temperature of 25° C. to form a thin layer thereof having a thickness of 0.2 mm. The thin dope solution layer was immersed in a coagulating liquid consisting of methyl alcohol at a temperature of 25° C. for approximately 20 hours. The resultant coagulated membrane was removed from the coagulating liquid, was immersed in n-hexane at a temperature of 25° C. for 20 hours, was air-dried at a temperature of 25° C. for 5 hours while blowing air into the dryer, was dried at a temperature of 100° C. for one hour, and, finally, was heat-treated at a temperature of 200° C. for 3 hours.

The resultant porous membrane substrate A has a thickness of approximately 25 microns and exhibited a hydrogen gas permeability ($pH_2$) of $7.1 \times 10^{-3}$ cm$^3$/cm$^2$·sec·cmHg and a ratio ($pH_2/pCO$) of the hydrogen gas permeability ($pH_2$) to the carbon monoxide permeability ($pCO$) of 2.8.

EXAMPLE 2 (Preparation of a porous membrane substrate B)

The same procedures as those described in Example 1 were carried out except that the resultant porous membrane was treated by immersing it in a benzene solution containing 10% by weight of α-chloronaphthalene at 25° C. for 5 hours, by air drying it at 25° C. for 18 hours while blowing air into the dryer, by drying it at 100° C. for one hour, and then by heat-treating it at 200° C. for 2 hours.

The resultant treated porous membrane substrate B exhibited a hydrogen gas permeability of $4.5 \times 10^{-5}$ cm$^3$/cm$^2$·sec·cmHg and a ratio ($pH_2/pCO$) of 8.1.

EXAMPLE 3 (Preparation of a dilute dope solution (1))

The same polyimide-preparing procedures as those described in Example 1 were carried out. The resultant polyimide solution was homogeneously mixed with tetrabromoethane and para-chlorophenol so as to provide a dilute dope solution (1) consisting of 100 parts by weight of tetrabromoethane, 7.41 parts by weight of para-chlorophenol, and 0.47 parts by weight of the aromatic polyimide.

EXAMPLE 4 (Preparation of a dilute dope solution (2))

The same polyimide-preparing procedures as those described in Example 1 were carried out. The resultant polyimide solution was mixed with adequate amounts of tetrabromoethane, α-chloronaphthalene, and para-chlorophenol. The resultant dilute dope solution (2) was composed of 50 parts by weight of tetrabromoethane, 50 parts by weight of α-chloronaphthalene, 9.84 parts by weight of para-chlorophenol, and 0.52 parts by weight of the polyimide.

EXAMPLE 5 (Preparation of a composite membrane)

The aromatic polyimide porous membrane substrate (B) was immersed in the dilute dope solution (1) for approximately one minute and then was removed therefrom, and the coated layer of the dilute dope solution formed on the membrane substrate was air-dried at 25° C. for 18 hours while blowing air into the air-drying apparatus, was dried at 100° C. for 3 hours, and, finally, was heat-treated at 200° C. for 3 hours.

The resultant composite membrane was subjected to the gas-permeating test. The results of the test are indicated in Table 1.

EXAMPLE 6 (Preparation of a composite membrane)

The aromatic polyimide porous membrane substrate B was immersed in chlorobenzene at 25° C. for 20 minutes and then was removed therefrom. Both surface of the removed porous membrane substrate were wiped with a filter paper so as to remove portions of the chlorobenzene located on the outer surfaces of the porous membrane substrate B and to maintain the remaining portion of the chlorobenzene inside the porous membrane substrate B.

The chlorobenzene-impregnated porous membrane substrate was subjected to the same coating procedures as those described in Example 5.

The results of the gas-permeating test to which the resultant composite membrane was subjected are indicated in Table 1.

EXAMPLE 7 (Preparation of a composite membrane)

The same procedures as those described in Example 6 were carried out except that triethylene glycol was used in place of chlorobenzene and the dilute dope solution (2) was used in place of the dilute dope solution (1).

The results of the gas-permeating test to which the resultant composite membrane was subjected are indicated in Table 1.

ml of NMP at a temperature of 30° C. and a degree of imidization of 5% or less.

EXAMPLE 9 (Preparation of a polymer (2))

The same procedures as those described in Example 8 were carried out except that s-BPDA was replaced by pyromellitic dianhydride. A dope solution containing a polyamic acid (2) was obtained.

The polyamic acid (2) exhibited a logarithmic viscosity of 1.35 determined in the same manner as described in Example 8 and a degree of imidization of 5% or less.

EXAMPLE 10 (Preparation of a polymer (3))

The same polyimide-preparing procedures as those described in Example 1 were carried out except that para-chlorophenol (PCP) was used in an amount of 178 g and the temperature of the heated reaction mixture was maintained at 180° C. for 6.5 hours.

The resultant polyimide (3) exhibited a logarithmic viscosity of 2.18 determined in the same manner as that described in Example 1 and a degree of imidization of 95% or more.

EXAMPLE 11 (Preparation of a polymer (4))

The same type of separable flask as that described in Example 1 was charged with a reaction mixture of 57.4 millimoles of 3,3',4,4'-benzophenone tetracarboxylic dianhydride (BTDA), 57.4 millimoles of DADE, and 270 g of NMP. The reaction mixture was polymerized at a temperature of 20° C. for 3 hours while flowing nitrogen gas through the flask. The resultant polyamic acid solution was mixed with 200 g of NMP, 27.5 g of pyridine, and 35.5 g of acetic anhydride. The mixture was heated to a temperature of 80° C and was held at

TABLE 1

| Example No. | Type of liquid impregnated in porous membrane substrate | Composition of dilute dope solution | | Gas-permeating test | | |
|---|---|---|---|---|---|---|
| | | Component | Amount (parts by wt) | Tested material | $pH_2$ $(cm^3/cm^2 \cdot sec \cdot cmHg)$ | $pH_2/pCO$ |
| 1 | — | — | — | porous membrane substrate | $7.1 \times 10^{-3}$ | 2.8 |
| 2 | — | — | — | porous membrane substrate | $4.5 \times 10^{-5}$ | 8.1 |
| 5 | — | tetrabromoethane para-chlorophenol polyimide | 100.0 7.41 0.47 | composite membrane | $8.9 \times 10^{-7}$ | 42 |
| 6 | chloro-benzene | tetrabromoethane para-chlorophenol polyimide | 100.0 7.41 0.47 | composite membrane | $9.5 \times 10^{-7}$ | 34 |
| 7 | triethylene glycol | α-chloronaphthalene tetrabromoethane para-chlorophenol polyimide | 50.0 50.0 9.80 0.52 | composite membrane | $1.0 \times 10^{-6}$ | 26 |

EXAMPLE 8 (Preparation of a polymer (1))

The same type of flask as that described in Example 1 was charged with 40 millimoles of 3,3',4,4'-biphenyltetracarboxylic dianhydride (s-BPDA), 40 millimoles of 4,4'-diaminodiphenyl ether (DADE), and 178 g of N-methyl-2-pyrrodidone (NMP). The mixture in the flask was subjected to a polymerization procedure at a temperature of 20° C. for 6 hours so as to prepare a polyamic acid (1).

The polyamic acid (1) exhibited a logarithmic viscosity of 1.95 determined at a concentration of 0.5 g per 100 this temperature for one hour while being vigorously stirred so as to imide-cyclize the polyamic acid into the corresponding polyimide. The resultant mixture was mixed with a large amount of methyl alcohol so as to allow the resultant polyimide to entirely precipitate from the solution. The precipitated polyimide was separated from the mixture by means of filtration. The polyimide powder was washed with methyl alcohol and dried.

The isolated polyimide powder (4) exhibited a logarithmic viscosity of 2.05 determined in the same manner as that described in Example 10 and a degree of imidization of 95% or more.

EXAMPLES 12 THROUGH 15 (Preparation of porous membrane substrates C.D.E., and F.)

In each of the Examples 12 through 15, a dope solution having the composition indicated in Table 2 was prepared, filtered, and then degassed under a reduced pressure.

The dope solution was spread on a surface of a horizontal glass plate at a temperature of approximately 60° C., and the thickness of the dope solution layer was made uniform by using a doctor knife. The resultant dope solution layer had a uniform thickness of 0.2 mm.

The dope solution layer was dried and heated at a temperature of 100° C. for 3 hours and then at a temperature of 200° C. for 5 hours so as to gradually evaporate the solvent. A porous membrane substrate having a thickness of from 15 to 20 microns was obtained.

The resultant porous membrane substrate was subjected to the gas-permeating test at a temperature of 50° C. The results are indicated in Table 2.

EXAMPLES 16 THROUGH 22 (Preparation of dilute dope solutions (3) through (9))

In each of Examples 16 through 22, a dilute dope solution having the composition indicated in Table 3 was prepared.

TABLE 3

| | Composition of dilute dope solution for coating layer | | | | | | |
|---|---|---|---|---|---|---|---|
| | Polymer | | | Solvent | | | Resultant |
| | | Logarithmic | Concentration | Base component | | Additional component | | dilute |
| Example No. | Type | viscosity | (% wt) | Compound | Amount (parts by wt) | Compound | Amount (parts by wt) | dope solution |
| 16 | Polyimide (3) (Example 10) | 2.18 | 0.5 | 1,1,2,2-tetrachloroethane | 100 | PCP | 4.74 | (3) |
| 17 | Polyimide (3) (Example 10) | " | 1.0 | " | " | PCP | 10.0 | (4) |
| 18 | Polyimide (3) (Example 10) | " | 0.4 | " | " | PCP | 6.80 | (5) |
| 19 | Polyamic acid (1) (Example 8) | 1.95 | 0.5 | NMP | " | — | | (6) |
| 20 | Polyamic acid (1) (Example 8) | " | 1.0 | MMP 1,1,2,2-tetrachloroethane | 100 58 | — | | (7) |
| 21 | Polyamic acid (1) (Example 8) | " | 1.0 | Dimethylsulfoxide | 100 | — | | (8) |
| 22 | Polyamic acid (1) (Example 8) and Polyamic acid (2) (Example 9) | 1.95 1.35 | | NMP 1,1,2,2-tetrachloroethane | 100 58 | — | | (9) |

EXAMPLES 23 THROUGH 30 (Preparation of composite membranes)

In each of the Examples 23 through 30, a porous membrane substrate of the type indicated in Table 4 was immersed in a dilute dope solution of type indicated in Table 4 at a temperature of 25° C. for 20 minutes. The resultant thin coating layer of the dilute dope solution was air-dried at a temperature of 25° C. for the time indicated in Table 4 while blowing air into the dryer and was heated at 100° C. for the time indicated in Table 4 and then at 200° C. for the time indicated in Table 4.

The resultant composite membrane was subjected to the gas-permeating test at the temperature indicated in Table 4. The results are indicated in Table 4.

TABLE 2

| | Composition of dope solution for porous membrane substrate | | | | | | | | |
|---|---|---|---|---|---|---|---|---|---|
| | Polymer | | | Solvent | | | | Gas-permeating test (50° C.) | | Type of |
| | | | | Organic polar liquid | | Additional aromatic liquid | | Hydrogen gas | | resultant |
| Example No. | Type | Logarithmic viscosity | Concentration (%) | Type | Amount (parts by wt) | Type | Amount (parts by wt) | permeability (cm³/cm²·sec·cmHg) | $pH_2/pCO$ | porous membrane substrate |
| 12 | Polyamic acid (1) (Example 8) | 1.95 | 6.9 | NMP | 100 | α-chloro-naphthalene | 51 | $2.0 \times 10^{-6}$ | 21 | C |
| 13 | Polyamic acid (2) (Example 9) | 1.35 | 6.2 | " | 100 | α-chloro-naphthalene | 70 | $9.2 \times 10^{-6}$ | 16 | D |
| 14 | Polyimide (3) (Example 10) | 2.18 | 6.1 | PCP | 100 | α-chloro-naphthalene | 70 | $5.0 \times 10^{-6}$ | 18 | E |
| 15 | Polyimide (4) (Example) | 2.05 | 5.8 | " | 100 | α-chloro-naphthalene | 80 | $1.3 \times 10^{-5}$ | 14 | F |

TABLE 4

| | Preparation of composite membrane | | | | | | | Gas-permeating test | | |
|---|---|---|---|---|---|---|---|---|---|---|
| | Porous membrane substrate | | Dilute dope solution | | Drying-heating time (hr) | | | | Hydrogen gas permeability | |
| Example No. | Type | pH₂/pCO (50° C.) | Type | Type of polymer contained | 25° C. air-drying | 100° C. | 200° C. | Temperature (°C.) | (cm³/cm²·sec·cmHg) | pH₂/pCO |
| 23 | C | 21 | (3) | Polyimide (3) | 20 | 1 | 2 | 85 | 7.1 × 10⁻⁶ | 180 |
| 24 | C | 21 | (4) | " | 18 | 3 | 3 | 26 | 1.1 × 10⁻⁶ | 141 |
| | | | | | | | | 80 | 4.2 × 10⁻⁶ | 114 |
| 25 | C | 21 | (5) | " | 20 | 1 | 3 | 85 | 7.3 × 10⁻⁶ | 285 |
| 26 | C | 21 | (6) | Polyamic acid (1) | 16 | 1 | 2 | " | 6.2 × 10⁻⁶ | 181 |
| 27 | C | 21 | (7) | Polyamic acid (1) | 16 | 1 | 3 | " | 4.1 × 10⁻⁶ | 142 |
| 28 | C | 21 | (8) | Polyamic acid (1) | 20 | 1 | 3 | " | 6.8 × 10⁻⁶ | 125 |
| 29 | D | 16 | (9) | Polyamic acids (1) and (2) | 20 | 1 | 2 | " | 5.8 × 10⁻⁶ | 104 |
| 30 | E | 18 | (7) | Polyamic acid (1) | 16 | 1 | 2 | " | 3.0 × 10⁻⁶ | 115 |

We claim:

1. A process for producing an aromatic polyimide composite separating membrane comprising:
   (A) preparing a substrate consisting of an aromatic polyimide porous membrane (1) by forming a dope solution of an aromatic polymeric material consisting essentially of at least one member selected from the group consisting of aromatic polyamides and aromatic polyamic acids and dissolved in a concentration of from 3% to 30% by weight in a solvent consisting essentially of a mixture of 100 parts by weight of at least one polar organic liquid compound capable of dissolving therein at least 5% by weight of said aromatic polymeric material and 5 to 100 parts by weight of at least one additional aromatic compound incapable of dissolving therein an amount of more then 3% by weight of said aromatic polymeric material, compatible with said polar organic liquid compound and having a poorer evaporating rate than that of said polar organic liquid compound, (2) by forming a thin layer of said dope solution, and (3) by drying said thin dope solution layer and then heating said dried layer at an elevated temperature, whereby said thin dope solution layer is converted to a thin solid porous membrane, and where said aromatic polymeric material in said dope solution contains an aromatic polyamic acid, said heating procedure is carried out under conditions adequate to convert said aromatic polyamic acid into the corresponding aromatic polyimide;
   (B) coating at least one surface of said aromatic polyimide porous membrane substrate with a dilute dope solution containing 0.01 to 5 parts by weight of an aromatic polymeric material consisting essentially of at least one polymer selected from the group consisting essentially of soluble aromatic polyimides and aromatic polyamic acids dissolved in a solvent consisting essentially of 100 parts by weight of a base component consisting of at least one organic liquid compound incapable of dissolving therein more than 3% by weight of said aromatic polymeric material in said porous membrane substrate and 0 to 15 parts by weight of an additional component consisting of at least one organic polar liquid compound capable of dissolving therein more than 5% by weight of said aromatic polymeric material and compatible with said base component, to form a coating layer of said dilute dope solution, and
   (C) evaporating said solvent from said coating layer of said dope solution.

2. The process of claim 1 wherein said aromatic polyimide porous membrane substrate exhibits a hydrogen gas permeability ($pH_2$) greater than $1 \times 10^{-7}$ cm³/cm²·sec·cmHg and a ratio ($pH_2/CO$) of the hydrogen gas permeability ($pH_2$) to the carbon monoxide gas permeability ($pCO$) of 2 to 50.

3. The process of claim 1, wherein said aromatic polyimide porous membrane substrate has a thickness of from 2 to 500 microns.

4. The process of claim 1, wherein said porous membrane substrate consists essentially of at least one aromatic polymer having at least 80 molar % of at least one recurring unit selected from those of the formulae (I) and (II):

$$\left[ \begin{array}{c} \phantom{x} \\ N \\ \phantom{x} \end{array} \begin{array}{c} CO \\ \diagup \quad \diagdown \\ CO \end{array} R \begin{array}{c} CO \\ \diagup \quad \diagdown \\ CO \end{array} N-R^1 \right] \quad (I)$$

and $$\left[ \begin{array}{c} NHCO \\ \phantom{x} \\ HOOC \end{array} R \begin{array}{c} CONH \\ \phantom{x} \\ COOH \end{array} R^1 \right] \quad (II)$$

wherein R represents a tetravalent aromatic radical, and $R^1$ represents a divalent aromatic radical.

5. The process of claim 4, wherein said tetravalent aromatic radical represented by R in the formulae (I) and (II) is selected from those of the formulae:

-continued

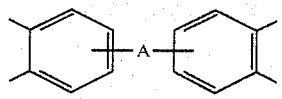

wherein A represents a divalent linking moiety selected from the group consisting of —CO—, —S—, —O—, —SO$_2$—, —SO—, —CH$_2$—, and —C(CH$_3$)$_2$—.

6. The process of claim 4, wherein said divalent aromatic radical represented by R$^1$ in formulae (I) and (II) is selected from those of formulae:

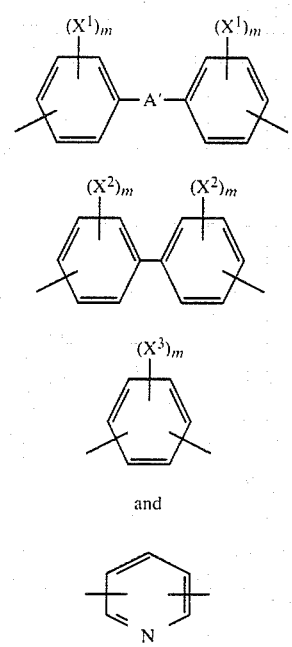

wherein X$^1$, X$^2$, and X$^3$ represent, independently from each other, a member selected from the group consisting of a hydrogen atom, the lower alkyl radicals having 1 to 3 carbon atoms and the lower alkoxyl radicals having 1 to 3 carbon atoms, X$^3$ represents a carboxyl radical; A' represents a divalent linking moiety selected from the group consisting of —O—, —S—, —CO—, —SO$_2$—, —SO—, —CH$_2$—, and —C(CH$_3$)$_2$—; and m represents an integer of from 1 to 4.

7. The process of claim 1, wherein said polymeric material for said porous membrane substrate consists essentially of at least one aromatic polyimide and said solvent for said aromatic polymeric material consists essentially of at least one phenolic compound selected from the group consisting of monohydric phenol compounds, dihydric phenol compounds, halogenated phenols, and halogenated cresols.

8. The process of claim 1, wherein said additional aromatic compound is incapable of dissolving therein more than 1.5% by weight of said aromatic polymeric material.

9. The process of claim 1, wherein said additional aromatic compound has a boiling point of at least 5° C. above the boiling point of said polar organic liquid compound.

10. The process of claim 1, wherein said thin layer of said dope solution for said porous membrane substrate is formed at a temperature of from 0° to 120° C.

11. The process of claim 1, wherein said thin layer of said dope solution for said porous membrane substrate is dried and heated at a temperature of from 20° to 400° C.

12. The process of claim 1, wherein in said dilute dope solution said aromatic polymeric material for said coating layer consists essentially of at least one aromatic polymer having at least 70 molar % of at least one recurring unit selected from those of the formulae (I) and (II):

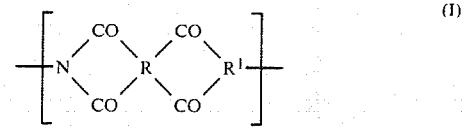

and

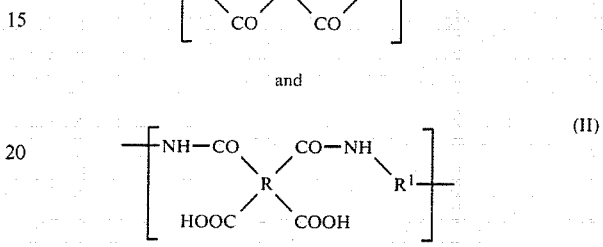

wherein R represents a tetravalent aromatic radical and R$^1$ represents a divalent aromatic radical; said base component in said solvent consists essentially of at least one member selected from the group consisting of halogenated hydrocarbon liquid compounds, amide liquid compounds, alkylsulfoxide liquid compounds, alkylurea-type liquid compounds, cyclic ether-type liquid compounds, and glycol-type liquid compounds; and said additional component of said solvent consists essentially of at least one phenolic liquid compound.

13. The process of claim 12, wherein said aromatic polymeric material for said coating layer is an aromatic polyimide material consisting essentially of at least one soluble aromatic polyimide having at least 70 molar % of at least one recurring unit selected from those of the formulae (III) and (IV):

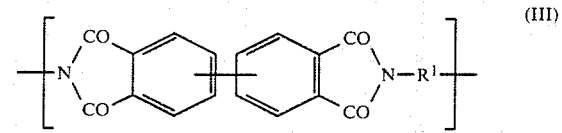

and

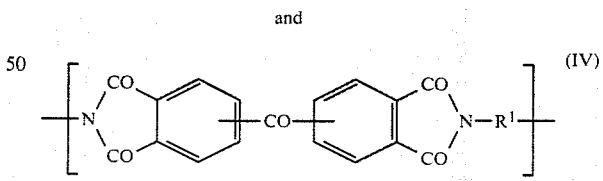

wherein R$^1$ represents a divalent aromatic radical, and said solvent consists essentially of 85 to 95% by weight of a base component consisting essentially of at least one member selected from the group consisting of halogenated hydrocarbon liquid compounds, amide liquid compounds, alkylsulfoxide liquid compounds, alkylurea liquid compounds, cyclic ether liquid compounds, and glycol liquid compounds and 5 to 15% by weight of an additional component consisting essentially of at least one phenolic liquid component.

14. The process of claim 12, wherein said aromatic polymeric material for said coating layer is an aromatic polyamic acid consisting essentially of at least one aromatic polyamic acid having at least 40 molar % of at least one recurring unit of the formula (II), the balance consisting essentially of at least one recurring unit of the formula (I), and said solvent consist essentially of a base component of at least one member selected from the group consisting of amide liquid compounds, alkylsulfoxide liquid compounds, alkylurea liquid compounds, cyclic ether liquid compounds, and glycol liquid compounds.

15. The process of claim 12, wherein said dilute dope solution of said aromatic polymeric material for said coating layer is an aromatic polyimide material consisting essentially of at least one aromatic polyimide having at least 70 molar % of at least one recurring unit selected from those of the formulae (III) and (IV), and said solvent consists essentially of 100 parts by weight of a base component consisting essentially of at least one halogenated hydrocarbon liquid compound and 0.5 to 15 parts by weight of an additional component consisting essentially of at least one phenolic liquid compound.

16. The process of claim 1, wherein said dilute dope solution for said coating layer has a rotation viscosity of 1 to 500,000 centipoises.

17. The process of claim 1, wherein said porous membrane is coated at a temperature of from 0° to 80° C.

18. The process of claim 1, wherein the thickness of the dilute dope coating layer is in the range of from 0.1 to 200 microns.

19. The process of claim 1, wherein said solvent is evaporated from said dilute dope solution coating layer by heating at a temperature of 20° to 300° C.

20. The process of claim 1, wherein said coating layer has a thickness of not more than 5 microns.

21. An aromatic polyimide composite separating membrane of the process of claim 1 having a hydrogen gas permeability ($H_2$) of at least $1\times 10^{-}cm^3/cm^2$ sec cmHg and a ratio ($\rho H_2/\rho CO$) of the hydrogen gas permeability ($\rho H_2$) to the carbon monoxide gas permeability ($\rho CO$) of at least 95.

22. An aromatic polyimide composite separating membrane produced in accordance with the process as claimed in claim 1.

* * * * *